United States Patent Office 3,746,764
Patented July 17, 1973

3,746,764
MEDICAMENT WITH HYPOGLYCEMIC PROPERTIES AND PROCESS FOR ITS PREPARATION
Joseph Nordmann, Paris, Georges Dominique Mattioda, Enghien-les-Bains, and Gerrard Paul Marie Henri Loiseau, Sceaux, France, assignors to Ugine Kuhlmann, Paris, France
No Drawing. Filed Oct. 14, 1971, Ser. No. 189,258
Claims priority, application France, Oct. 14, 1970, 7037063
Int. Cl. C07c *129/00*
U.S. Cl. 260—564 F   1 Claim

ABSTRACT OF THE DISCLOSURE

The present invention provides a compound of the following formula:

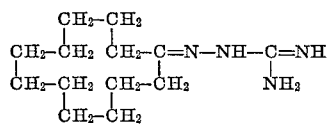

useful as a medicament having hypoglycemic properties.

---

The present invention concerns a medicament with hypoglycemic properties and process for its preparation.

According to the present invention cyclododecanylidene-aminoguanidine is provided of the formula:

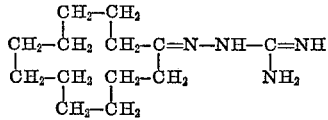

The invention includes a process for the preparation of this compound by the condensation of cyclododecanone with a salt of aminoguanidine. In the following example which illustrates such a process the parts are parts by weight unless the contrary is stated.

EXAMPLE 45.5 parts of cyclododecanone are dissolved in 300 parts by volume of ethanol maintained at 60° C. A mixture comprising 56.25 parts of hydrated aminoguanidine bicarbonate (content 72.5%), 200 parts of water and 25.4 parts by volume of concentrated hydrochloric acid is added to the above solution. Then a solution of 12 parts of sodium hydroxide in 50 parts of water is added all at once. The mixture is refluxed with stirring for 3 hours. After cooling and diluting to up to 4000 parts by volume by means of ice water, 57 parts of cyclododecanylidene-aminoguanidine are obtained. This product is recrystallised from carbon tetrachloride or dichloroethane. 51 parts are obtained. M.P. (Maquenne): 142° C. pK$_B$: 9.9.

The cyclododecanylidene-aminoguanidine is insoluble in water, but soluble at 1% in edible olive oil.

*Analysis.*—Calc'd for $C_{13}H_{26}N_4$ (percent): C, 65.50; H, 10.99; N, 23.50. Found (percent): C, 65.20; H, 10.60; N, 23.20.

Toxicological and pharmacological properties

The compound of this invention has a rather weak toxicity and when tested on Swiss Albino mice, taken orally, its L.D. 50 is in fact between 300 and 900 milligrams per kilogram of animal weight.

From the pharmacological point of view, its most striking property is its hypoglycemic action. This action has been able to be shown with rats according to the following record: 30 male animals are divided into 3 equal groups, one group of control animals, a group of animals treated at a dose of 200 mg./kg. with phenformine (hypoglycemiant used for comparison) and a group treated at a dose of 200 mg./kg. with the compound of the invention.

The animals take food ad lib.

The test is carried out for 8 days. The animals are treated orally daily for four days and the serumal glucose is determined by the potassium ferricyanide method (Hoffman, W. S., J. Biol. Chem., 120, 51 (1937), on the fourth day, four hours after the last oral administration, as well as on the eighth day.

In order to evaluate the hypoglycemic activity, the mean level of the treated group ($\overline{X}$TR) is compared with that of the controls ($\overline{X}$TE). For this purpose there are calculated:

(a) the average differences, say $\Delta X = \overline{X}TE - \overline{X}TR$ and the coefficient "*t*" of student which enables one to determine if the apparent difference is significant, and
(b) the rate of decrease or increase which the average glycemia of the treated group shows with respect to that of the controls, $$TD = \frac{XTE - XTR}{XTE} \times 100$$

Under these conditions the results obtained are as follows:

| Product | Dose, mg./kg. | Variation in per-cent of glycemia | Mortality |
|---|---|---|---|
| Phenformine | 200 | [1] −18 | 0/10 |
| Compound of the invention | 200 | [1] −26 | 0/10 |

[1] Highly significant: probability equal to or greater than 99.9%.

The compound of the invention, under the experimental conditions described, thus has a superior activity of almost half as much again as that of phenformine, the reference product.

Therapeutic utilisation

The compound of the invention may be used together with pharmaceutically acceptable carriers in human therapeutics, for example, orally in the form of for example compressed tablets, gelatine-coated pills or cachets, at a daily dose of 50 to 300 mg. of the active compound. It is particularly indicated for the treatment of sugar diabetes.

We claim:
1. The compound of the following formula:

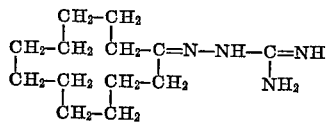

References Cited
UNITED STATES PATENTS
2,596,930   5/1952   Kaiser _____ 260—564 F
2,952,677   9/1960   Birtwell et al. _____ 260—564 F LEON ZITVER, Primary Examiner
G. A. SCHWARTZ, Assistant Examiner 424—326
U.S. Cl. X.R.

UNITED STATES PATENT OFFICE
CERTIFICATE OF CORRECTION

Patent No. 3,746,764　　　　　　　Dated July 17, 1973

Inventor(s) Joseph Nordmann, Georges Dominique Mattioda and Gerrard Paul Marie Henri Loiseau It is certified that error appears in the above-identified patent and that said Letters Patent are hereby corrected as shown below:

In the Heading, change the identification of the corresponding French Patent Application from "7037063" to -- 7037068 --.

Signed and sealed this 27th day of November 1973.

(SEAL)
Attest:

EDWARD M. FLETCHER, JR.　　　　　RENE D. TEGTMEYER
Attesting Officer　　　　　　　　Acting Commissioner of Patents